May 20, 1958  E. O. UHRIG  2,835,854
TWO CHANNEL SERVO SYSTEM
Filed Jan. 16, 1956
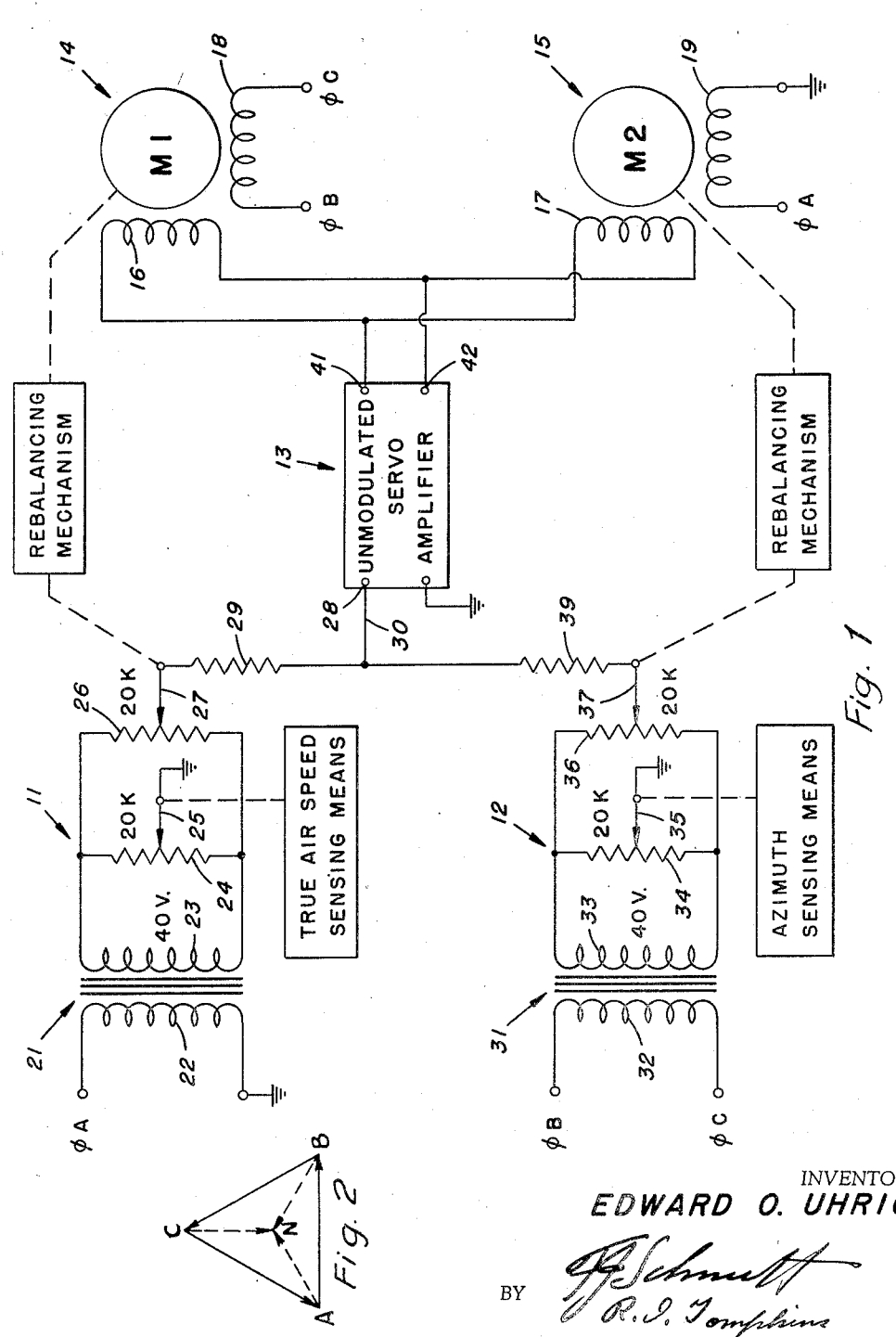
INVENTOR
EDWARD O. UHRIG
BY
ATTORNEYS

United States Patent Office 2,835,854
Patented May 20, 1958

2,835,854

TWO CHANNEL SERVO SYSTEM

Edward O. Uhrig, Euclid, Ohio, assignor, by mesne assignments, to the United States of America as represented by the Secretary of the Navy Application January 16, 1956, Serial No. 559,499

13 Claims. (Cl. 318—19)

The present invention relates to a two channel servo system particularly adapted for use in aircraft fire control systems but not necessarily limited thereto.

In aircraft having moveable guns, the guns may be orientated with respect to the aircraft by servomotors operable in response to signals representative of air density, true air speed, and the azimuth and elevation of the target with respect to the aircraft. In aircraft having fixed guns the aircraft itself may be positioned according to the above mentioned parameters, the aircraft controls being operated by servomotors. Heretofore, it has been necessary to provide a separate servo system for each of the four mentioned parameters. It has been found that since the true air speed and density servos have low dynamic operation, signals representative of true air speed and azimuth and signals representative of air density and target elevation may be combined into single two channel servo systems respectively without undesirable circuit operation from cross-talk into the azimuth and elevation channels, thus achieving considerable economy in circuit components with attendant advantages in increased reliability and diminished weight and bulk. Cross-talk into the true air speed and density channels is not deleterious since these parameters are not critical in typical aircraft fire control systems. In addition to use as described above, the present invention is adapted for use in any servo system which involves two dissimilar parameters and which will tolerate a small amount of cross-talk.

Accordingly it is an object of the present invention to provide a single servo system operable in response to two diverse parameters.

It is a further and more specific object of the present invention to provide a single servo system having two diverse inputs and two corresponding outputs.

It is a further and still more specific object of the present invention to provide a single servo system having a channel for each of two dissimilar inputs and providing corresponding outputs.

Other objects and many of the attendant advantages of the present invention will be readily appreciated as the same becomes better understood by reference to the following detailed description when considered in connection with the accompanying drawing wherein:

Fig. 1 represents a circuit diagram partly schematic of a preferred embodiment of the invention.

Fig. 2 is a vector diagram of the phase to phase and phase to neutral voltages of a three phase electrical system.

Referring now to the drawing there are shown two servomotor input circuits generally designated by reference numerals 11 and 12, an unmodulated servo amplifier 13, and two servomotors generally designated by reference numerals 14 and 15. The motors have control windings 16 and 17 respectively energized by the amplified signals from input circuits 11 and 12, and excitation windings 18 and 19 energized from the aircraft's A. C. electrical system in a manner to be hereinafter fully explained.

Input circuit 11 comprises a transformer 21 having a primary winding 22 and a secondary winding 23. The primary winding is energized by a phase to neutral voltage of the aircraft's A. C. electrical system (not shown). Phase A has been selected for example. Connected across the terminals of secondary winding 23 is a potentiometer 24 having a slider 25 translatable in accordance with the aircraft's true air speed by a sensing mechanism, shown schematically. An error voltage proportional to the translation of the slider and in phase with the voltage of secondary winding 23 will appear across a second potentiometer 26 provided with a slider 27 translatable by a rebalancing mechanism, shown schematically, operated by servomotor 14. The rebalancing mechanism shown represents any appropriate feedback or follow-up system whereby the shaft position of motor 14 may be compared with the error voltage. The error voltage is applied to a terminal 28 of amplifier 13 through a resistor 29 and a conductor 30.

Input circuit 12 is similar to input circuit 11 and includes a transformer 31 having a primary winding 32 and a secondary winding 33, a potentiometer 34 provided with a slider 35, and a second potentiometer 36 provided with a slider 37. A phase to phase voltage, selected to be 90° out of phase with the phase to neutral voltage applied to input circuit 11, is applied to primary winding 32. In the embodiment of the invention shown the phase B to phase C voltage has been selected. The quadrature relationship of the voltage applied to primary winding 22 of transformer 21 and the voltage applied to primary winding 32 of transformer 31 is shown in Fig. 2. The error voltage from input circuit 12 is applied to amplifier terminal 28 through a resistor 39 and conductor 30.

Representative values for the bridge networks of input circuits 11 and 12 have been shown on the drawing. The value of resistors 29 and 39 will depend upon the characteristics of amplifier 13. The transformation ratios of transformers 21 and 31 are selected to give secondary voltages of equal magnitude.

The control windings 16 and 17 are connected in parallel across the output terminals 41, 42 of amplifier 13. Excitation winding 18 of servomotor 14 is energized by the phase to phase voltage applied to transformer 31 and excitation winding 19 of servomotor 15 is energized by the phase to neutral voltage applied to transformer 21 (adjusted in magnitude).

The operation of the circuit is as follows: An error signal from input circuit 11, for example, is amplified and applied to parallel connected control windings 16 and 17. Servomotor 15 will not respond to this error voltage since the voltage applied to its excitation winding is in phase with the error voltage. Servomotor 14, however, will respond because its excitation winding is energized by a voltage 90° out of phase with the error voltage. In a similar manner only servomotor 15 will respond to an error voltage from input circuit 12. In a conventional manner operation of servomotor 14 or 15 will effect rebalancing of input circuit 11 or 12 respectively.

Only one servo system is shown, but it will be understood that a similar system will be provided for the other two fire control parameters.

Servomotors 14 and 15 together with other control means through a suitable coupling may effect translation of the aircraft's gun turret or the aircraft's controls in the case of an aircraft having fixed guns.

While a particular circuit has been disclosed, it will be obvious that other circuits may be employed in place of input circuits 11 and 12, for example, syncros or resolvers. Further any two voltages 90° phase displaced and of suitable magnitude may be used to energize input circuits 11, 12 and excitation windings 18, 19. It should therefore be understood that the foregoing disclosure relates only to a preferred embodiment of the invention and that numerous modifications or alterations may be made therein without departing from the spirit and scope of the invention and set forth in the appended claims.

What is claimed is:

1. A two channel servo system comprising: means to generate a first voltage in response to variation of a first parameter, means to generate a second voltage in response to variation of a second parameter, means combining said first and second voltages, and electroresponsive means connected to said combining means selectively responsive to said first and second voltages, said electroresponsive means including feed back means operable in response to actuation of said electroresponsive means to diminish said first and second voltages.

2. A two channel servo system comprising: an amplifier having input terminals and output terminals, means to apply a first error voltage to said input terminals, means to apply a second error voltage, 90° out of phase with said first error voltage, to said input terminals, and electroresponsive means connected to said output terminals and selectively responsive to said first and second error voltages.

3. A two channel servo system comprising: an amplifier having input terminals and output terminals, means to generate a first error voltage in response to variation of a first parameter, means to generate a second error voltage 90° out of phase with said first error voltage in response to variation of a second parameter, means connected to said input terminals for combining said first and second error voltages, and electroresponsive means connected to said output terminals selectively responsive to said first and second error voltages.

4. The combination of claim 3 including means responsive to actuation of said electroresponsive means to diminish said first and second error voltages.

5. A two channel servo system comprising: an amplifier having input terminals and output terminals, means to generate a first error voltage in response to variation of a first parameter, means to generate a second error voltage 90° out of phase with said first error voltage in response to variation of a second parameter, means applying said first and second error voltages to said input terminals, first electroresponsive means connected to said output terminals and responsive to said first error voltage, second electroresponsive means connected to said output terminals and responsive to said second error voltage, and feedback means responsive to operation of each of said electroresponsive means respectively to diminish said first and second error voltages.

6. A servo system comprising: a first signal forming means having input terminals and output terminals, means connecting the input terminals of said first signal forming means to a first source of voltage, a second signal forming means having input terminals and output terminals, means connecting the input terminals of said second signal forming means to a second source of voltage 90° out of phase with the voltage of said first source of voltage, and electroresponsive means having control means, first excitation means connected to said second source of voltage, second excitation means connected to said first source of voltage, and means connecting said control means to the output terminals of said first and second signal forming means.

7. The combination of claim 6 wherein: said last mentioned connecting means comprises an amplifier having input terminals connected to the output terminals of said first and second signal forming means and output terminals connected to said control means.

8. The combination of claim 7 wherein: said electroresponsive means comprises a first and second servomotor, said control means comprises a control winding on each of said first and second servomotors, and said first and second excitation means comprise an excitation winding on said first servomotor and an excitation winding on said second servomotor, respectively.

9. The combination of claim 8 including: first feedback means responsive to actuation of said first servomotor operable to diminish the voltage appearing across the output terminals of said first signal forming means, and second feedback means responsive to actuation of said second servomotor to diminish the voltage appearing across the output terminals of said second signal forming means.

10. A two channel servo system comprising: a first bridge network having input terminals connected to a first source of voltage and output terminals, a second bridge network having input terminals and output terminals, said input terminals being connected to a second source of voltage 90° out of phase with the voltage of said first source of voltage, means responsive to variation of a first parameter to unbalance said first bridge network to thereby produce a voltage across the output terminals thereof in phase with the voltage of said first source of voltage, means responsive to variation of a second parameter to unbalance said second bridge network to thereby produce a voltage across the output terminals thereof in phase with the voltage of second source of voltage, electroresponsive means having control means, first excitation means connected to said second source of voltage, and second excitation means connected to said first source of voltage, and means connecting said control means to the output terminals of said bridge networks.

11. The combination of claim 10 wherein: said last mentioned connecting means comprises an amplifier having input terminals connected to the output terminals of said bridge networks and output terminals connected to said control means.

12. The combination of claim 11 wherein: said electroresponsive means comprises a first and second servomotor, said first excitation means comprises an excitation winding on said first servomotor, said second excitation means comprises an excitation winding on said second servomotor, and said control means comprises a control winding on each of said first and second servo motors connected in parallel across the output terminals of said amplifier.

13. The combination of claim 12 including: first follow-up means responsive to actuation of said first servomotor operable to rebalance said first bridge network and second follow-up means responsive to actuation of said second servomotor to rebalance said second bridge network.

References Cited in the file of this patent
UNITED STATES PATENTS

| | | |
|---|---|---|
| 412,932 | Shallenberger | Oct. 15, 1889 |
| 2,728,882 | Cohen | Dec. 27, 1955 |